(12) United States Patent
Takeichi

(10) Patent No.: US 11,184,528 B2
(45) Date of Patent: Nov. 23, 2021

(54) ELECTRONIC APPARATUS, CONTROL METHOD THEREFOR, AND NON-TRANSITORY COMPUTER READABLE MEDIUM

(71) Applicant: CANON KABUSHIKI KAISHA, Tokyo (JP)

(72) Inventor: Shinya Takeichi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/208,532

(22) Filed: Mar. 22, 2021

(65) Prior Publication Data

US 2021/0306552 A1 Sep. 30, 2021

(30) Foreign Application Priority Data

Mar. 31, 2020 (JP) .............................. JP2020-063832

(51) Int. Cl.
*H04N 5/232* (2006.01)

(52) U.S. Cl.
CPC ... *H04N 5/23216* (2013.01); *H04N 5/232127* (2018.08); *H04N 5/232933* (2018.08)

(58) Field of Classification Search
CPC ......... H04N 5/23216; H04N 5/232127; H04N 5/232933
See application file for complete search history.

(56) References Cited

U.S. PATENT DOCUMENTS

| | | | |
|---|---|---|---|
| 10,897,568 B2 * | 1/2021 | Ueda .................. | H04N 5/23293 |
| 2017/0123497 A1 * | 5/2017 | Yonezawa ......... | H04N 5/232127 |
| 2019/0087082 A1 * | 3/2019 | Chaudhri ............. | G06F 3/04842 |
| 2019/0191101 A1 * | 6/2019 | Ogawa ...................... | G02B 7/28 |
| 2019/0391657 A1 * | 12/2019 | Yonezawa ............. | G06F 3/0486 |
| 2020/0393898 A1 * | 12/2020 | Ichikawa ............... | G06F 3/0488 |

FOREIGN PATENT DOCUMENTS

JP 2017102626 A 6/2017

* cited by examiner

*Primary Examiner* — Amy R Hsu
(74) *Attorney, Agent, or Firm* — Canon U.S.A., Inc. IP Division

(57) ABSTRACT

An electronic apparatus includes a display control unit configured to, in a case where a predetermined touch operation is made in a first area, perform control to display an indicator indicating a movable range of a selection position by a moving operation on a display unit regardless of a distance from a border between the first area and a second area to a touch position of the predetermined touch operation.

20 Claims, 7 Drawing Sheets

ELECTRONIC APPARATUS, CONTROL METHOD THEREFOR, AND NON-TRANSITORY COMPUTER READABLE MEDIUM

BACKGROUND

Field of the Disclosure

The present disclosure relates to an electronic apparatus capable of moving a selection position by a touch operation, and a method for controlling the electronic apparatus.

Description of the Related Art

Many apparatuses capable of moving a pointer displayed on a display screen by operating a touch panel that is capable of touch operations and located at a position different from the display screen have been known in recent years. Japanese Patent Application Laid-Open No. 2017-102626 discusses a method where a user specifies an automatic focus (AF) frame position by operating a touch panel located on the back of an imaging apparatus while looking into a viewfinder. Japanese Patent Application Laid-Open No. 2017-102626 discusses changing a display mode of the AF frame for user notification in a case where a touch position is about to go out of an effective touch area (approach the boundary of the effective touch area) in changing the AF frame position.

According to Japanese Patent Application Laid-Open No. 2017-102626, however, when the user operates the touch panel while viewing not the touch panel but the display screen, the display mode of the AF frame displayed on the display screen does not change until the operating finger approaches the boundary of the effective touch area. The user touching a position away from the boundary is therefore unable to find out the range capable of touch operations on the touch panel, i.e., how far a touch operation can be made or from where a touch operation can no longer be made.

SUMMARY

The present disclosure is directed to facilitating the user to find out a range where a selection position can be moved by a touch operation.

According to an aspect of the present disclosure, an electronic apparatus includes a control unit configured to, in a case where a moving operation for making a touch on an operation surface and moving the touch is made in a first area of the operation surface, control movement of a selection position displayed on a display unit by an amount corresponding to the moving operation, and in a case where the moving operation is made in a second area of the operation surface, the second area adjoining the first area, perform control such that the movement of the selection position is not performed, and a display control unit configured to, in a case where a predetermined touch operation is made in the first area, perform control to display an indicator indicating a movable range of the selection position by the moving operation on the display unit regardless of a distance from a border between the first and second areas to a touch position of the predetermined touch operation.

Further features of the present disclosure will become apparent from the following description of exemplary embodiments with reference to the attached drawings.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

An exemplary embodiment of the present disclosure will be described below with reference to the drawings.

Figure 1A:
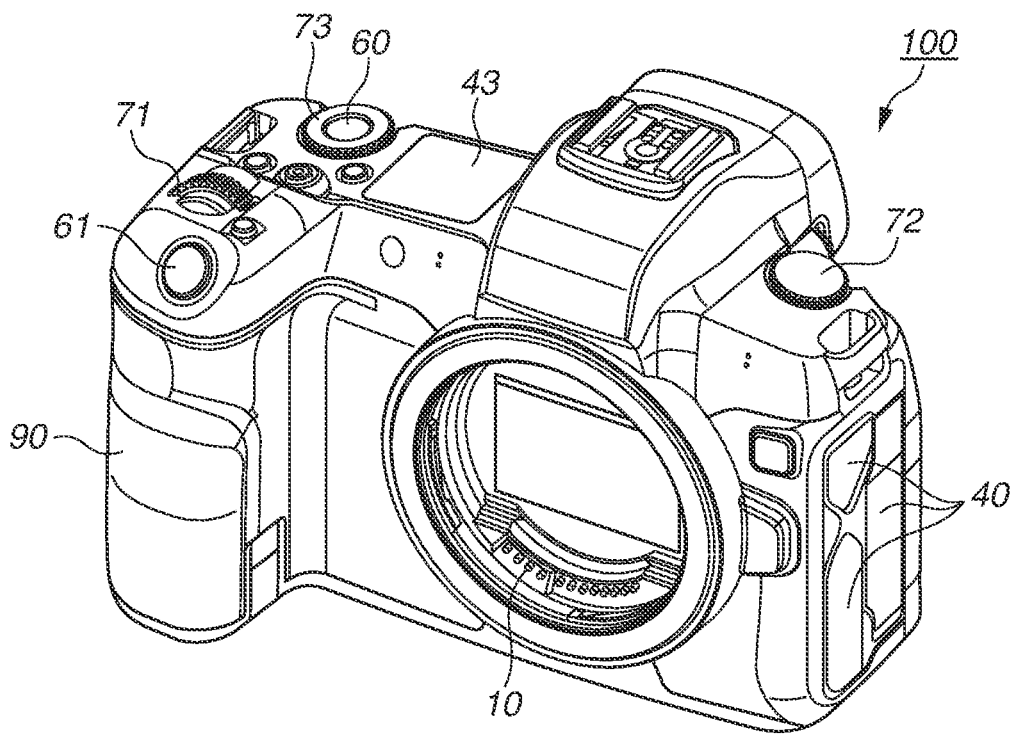
FIGS. 1A and 1B are external views of a digital camera according to one or more aspects of the present disclosure.
Figure 1B:
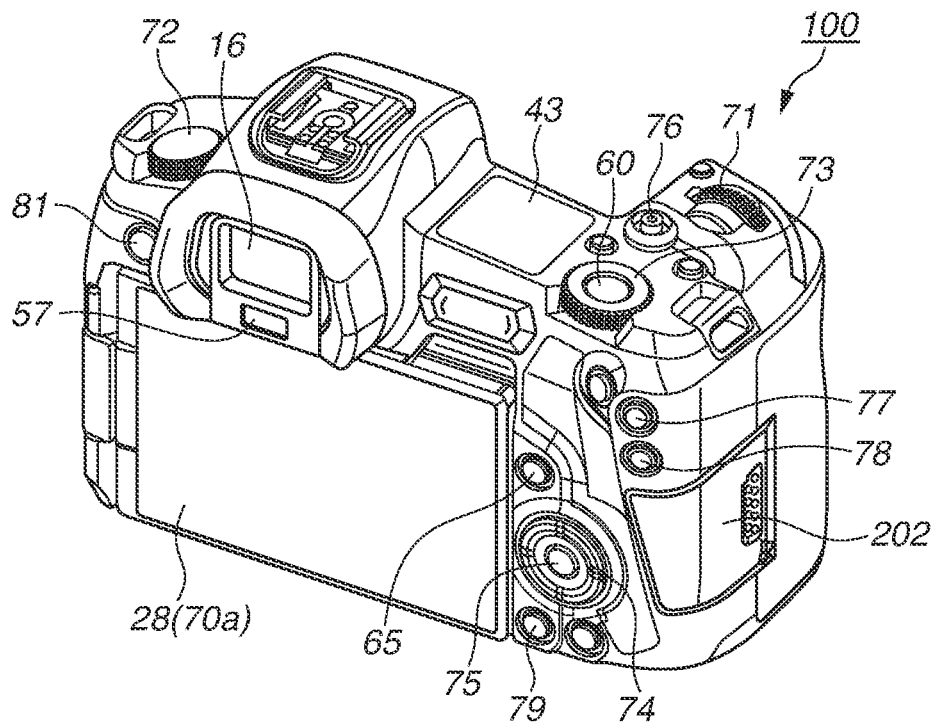

FIGS. 1A and 1B illustrate external views of a digital camera 100 that is an example of an apparatus to which an exemplary embodiment of the present disclosure can be applied. FIG. 1A is a front perspective view of the digital camera 100. FIG. 1B is a rear perspective view of the digital camera 100. In FIGS. 1A and 1B, a display unit 28 is a display unit located on the back of the digital camera 100. The display unit 28 displays images and various types of information. A touch panel 70a is a touch detection unit that can detect a touch operation. The touch panel 70a can detect a touch operation on the display surface (operation surface) of the display unit 28. An extra-viewfinder display unit 43 is a display unit located on the top of the digital camera 100. The extra-viewfinder display unit 43 displays various setting values of the digital camera 100, including a shutter speed and an aperture. A shutter button 61 is an operation unit for giving imaging instructions. A mode change switch 60 is an operation unit for switching between various modes. Terminal covers 40 are covers for protecting connectors (not illustrated) that connect connection cables of external devices with the digital camera 100. A main electronic dial 71 is a rotary operation member included in an operation unit 70. The main electronic dial 71 can be rotated to change setting values such as the shutter speed and the aperture. A power switch 72 is an operation member for switching on and off the power of the digital camera 100. A sub electronic dial 73 is a rotary operation member included in the operation unit 70 and can be used to move a selection frame and scroll through images. A directional pad 74 is an directional key operation member (four-way pad) included in the operation unit 70, and includes a push button the top, bottom, left, and right portions of which can be pressed in respective four directions. The digital camera 100 can be operated based on the pressed direction or portion of the directional pad 74. A set button 75 is a push button included in the operation unit 70 and mainly used to determine a selected item. A moving image button 76 is used to give instructions to start and stop capturing (recording) a moving image. An automatic exposure (AE) lock button 77 is included in the operation unit 70, and can lock an exposure state when pressed in an imaging standby state. A zoom button 78 is an operation button included in the operation unit 70 and intended to turn on/off a zoom mode of a live view display in an imaging mode. If the main electronic dial 71 is operated with the zoom mode on, a live view image can be zoomed in and out. In a playback mode, the zoom button 78 functions as a zoom button for enlarging a playback image to increase the enlargement ratio. A playback button 79 is an operation button included in the operation unit 70 and switches between the imaging mode and the playback mode. If the playback button 79 is pressed in the imaging mode, the digital camera 100 can enter the playback mode and display the latest image among images recorded in a recording medium 200 on the display unit 28. A menu button 81 is included in the operation unit 70. If the menu button 81 is pressed, a menu screen capable of making various settings is displayed on the display unit 28. The user can intuitively make various settings by using the menu screen displayed on the display unit 28, the directional pad 74, the set button 75, and/or a multi-controller (MC) 65. The MC 65 can accept directional instructions in eight directions and a push operation in the middle. A communication terminal 10 is used for the digital camera 100 to communicate with a lens unit 150 (detachable) to be described below. An eyepiece unit 16 is an eyepiece unit of an eyepiece viewfinder (look-into viewfinder). The user can visually recognize a video image displayed on an electronic viewfinder (EVF) 29 inside via the eyepiece unit 16. An eye approach detection unit 57 is an eye approach detection sensor that detects whether the photographer (user) puts his/her eye on the eyepiece unit 16. A lid 202 is a lid for a slot in which the recording medium 200 is accommodated. A grip unit 90 is a holding unit having a shape easy for the user to grip with the right hand when holding the digital camera 100 in position. The shutter button 61 and the main electronic dial 71 are located at positions where operations can be made with the right index finger in a state where the user holds the digital camera 100 by gripping the grip unit 90 with the right little finger, ring finger, and middle finger. The sub electronic dial 73 is located at a position where operations can be made with the right thumb in the same state.

Figure 2:
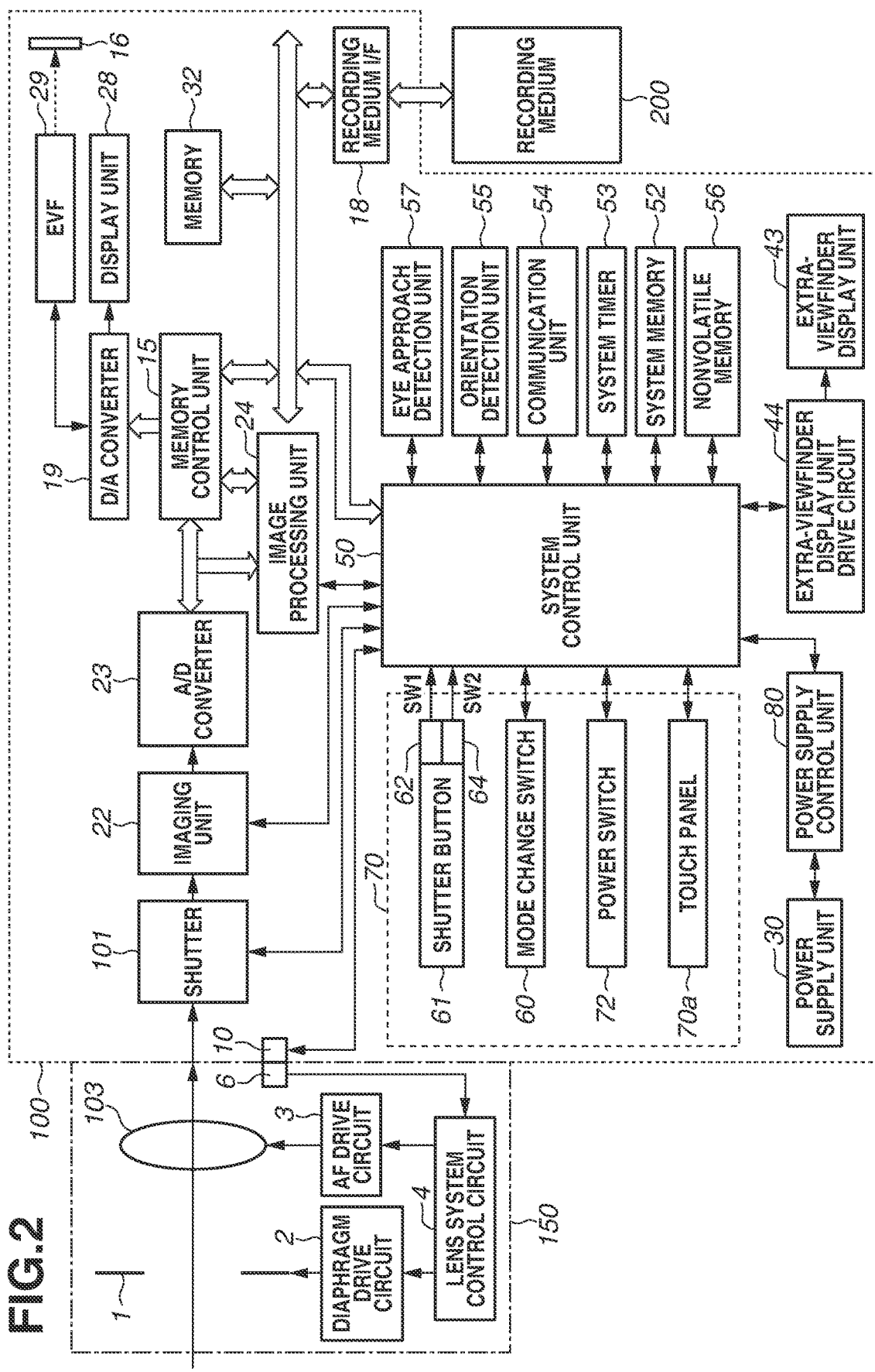
FIG. 2 is a schematic block diagram illustrating a hardware configuration example of the digital camera according to one or more aspects of the present disclosure.

FIG. 2 is a block diagram illustrating a configuration example of the digital camera 100 according to the present exemplary embodiment. In FIG. 2, the lens unit 150 is a lens unit including an interchangeable imaging leans. A lens 103 typically includes a plurality of lenses, but is represented here by a single lens for the sake of simplicity. A communication terminal 6 is used for the lens unit 150 to communicate with the digital camera 100. The lens unit 150 communicates with a system control unit 50 via the communication terminal 6 and the foregoing communication terminal 10, and controls a diaphragm 1 by a lens system control circuit 4 inside via a diaphragm drive circuit 2. The lens unit 150 then adjusts a focus by moving the lens 103 via an automatic focus (AF) drive circuit 3.

A shutter 101 is a focal plane shutter that can freely control exposure time of an imaging unit 22 based on control by the system control unit 50.

The imaging unit 22 is an image sensor including a charge-coupled device (CCD) or complementary metal-oxide-semiconductor (CMOS) device that converts an optical image into an electrical signal. An analog-to-digital (A/D) converter 23 is used to convert an analog signal output from the imaging unit 22 into a digital signal.

An image processing unit 24 performs resize processing, such as predetermined pixel interpolation and reduction, and color conversion processing on data from the A/D converter 23 or data from a memory control unit 15 to be described below. The image processing unit 24 also performs predetermined calculation processing by using captured image data. The system control unit 50 performs exposure control and distance measurement control based on the calculation results obtained by the image processing unit 24. Through-the-lens (TTL) AF processing, AE processing, and electronic flash (EF) (flash preliminary emission) processing are thereby performed. The image processing unit 24 further performs predetermined calculation processing by using the captured image data, and performs TTL automatic white balance (AWB) processing based on the obtained calculation result.

The memory control unit 15 controls data exchange between the A/D converter 23, the image processing unit 24, and a memory 32. Output data from the A/D converter 23 is written to the memory 32 via the image processing unit 24 and the memory control unit 15, or directly via the memory control unit 15. The memory 32 stores image data that is obtained by the imaging unit 22 and digitally converted by the A/D converter 23, and image data to be displayed on the display unit 28 and/or the EVF 29 (display unit inside the viewfinder). The memory 32 has a sufficient storage capacity to store a predetermined number of still images or a predetermined duration of moving image and sound.

The memory 32 also serves as an image display memory (video memory). Display image data written to the memory 32 is displayed on the display unit 28 and/or the EVF 29 via the memory control unit 15. A digital-to-analog (D/A) conversion unit 19 converts display image data stored in the memory 32 into an analog signal and supplies the analog signal to the display unit 28 and/or the EVF 29 via the memory control unit 15. Accordingly, the display image data written in the memory 32 is displayed on the display unit 28 and/or the EVF 29 via the D/A conversion unit 19. The display unit 28 and the EVF 29 provide display on their display devices, such as a liquid crystal display (LCD) and an organic electroluminescence (EL) display, based on signals from the memory control unit 15. A live view (LV) display can be provided by successively transferring data that is A/D-converted by the A/D converter 23 and accumulated in the memory 32 to the display unit 28 or the EVF 29 and displaying the transferred data. An image displayed by an LV display will hereinafter be referred to as an LV image.

Various setting values of the digital camera 100, including the shutter speed and the aperture, are displayed on the extra-viewfinder display unit 43 via an extra-viewfinder display unit drive circuit 44.

A nonvolatile memory 56 is an electrically erasable and recordable memory. For example, a flash read-only memory (ROM) is used as the nonvolatile memory 56. The nonvolatile memory 56 stores operating constants and a program for the system control unit 50. As employed herein, the program refers to a computer program for performing a flowchart to be described below in the present exemplary embodiment.

The system control unit 50 is a control unit including at least one processor or circuit, and controls the entire digital camera 100. Various processes of the present exemplary embodiment to be described below are implemented by executing the program recorded in the nonvolatile memory 56 described above. A system memory 52 is a random access memory (RAM), for example. The operating constants of the system control unit 50, variables, and the program read from the nonvolatile memory 56 are loaded into the system memory 52. The system control unit 50 also performs display control by controlling the memory 32 and the display unit 28.

A system timer 53 is a clocking unit that measures time used for various types of control and the time of a built-in clock.

The mode change switch 60, a first shutter switch 62, a second shutter switch 64, and the operation unit 70 are operation members for inputting various operation instructions into the system control unit 50. The mode change switch 60 switches the operation mode of the system control unit 50 to any one of still and moving image capturing modes. The still image capturing modes include an automatic imaging mode, an automatic scene determination mode, a manual mode, an aperture priority mode (aperture value (Av) mode), a shutter speed priority mode (time value (Tv) mode), and a program AE mode (P mode). Various scene modes to make imaging settings for respective imaging scenes, and a custom mode are also included. The user can directly switch the operation mode to any one of the modes by using the mode change switch 60. Alternatively, the user can once switch to an imaging mode list screen by using the mode change switch 60, select one of a plurality of modes that is displayed, and switch to the selected mode by using another operation member. Similarly, the moving image capturing mode may also include a plurality of modes.

The first shutter switch 62 turns on to generate a first shutter switch signal SW1 if the shutter button 61 provided on the digital camera 100 is operated halfway, i.e., half-pressed (imaging preparation instruction). In response to the first shutter switch signal SW1, the system control unit 50 starts imaging preparation operations such as AF processing, AE processing, AWB processing, and EF (flash preliminary emission) processing.

The second shutter switch 64 turns on to generate a second shutter switch signal SW2 if the shutter button 61 is completely operated, i.e., full-pressed (imaging instruction). In response to the second shutter switch signal SW2, the system control unit 50 starts a series of operations for imaging processing, including reading of a signal from the imaging unit 22 to writing of a captured image to the recording medium 200 as an image file.

The operation unit 70 includes various operation members serving as input units for accepting operations from the user. The operation unit 70 includes at least the following operation members: the shutter button 61, the multi-controller 65, the touch panel 70a, the main electronic dial 71, and the power switch 72. The operation unit 70 also incudes the sub electronic dial 73, the directional pad 74, the set button 75, the moving image button 76, the AE lock button 77, the zoom button 78, the playback button 79, and the menu button 81.

A power supply control unit 80 includes a battery detection circuit, a direct-current-to-direct-current (DC-DC) converter, and a switch circuit for switching blocks to be energized. The power supply control unit 80 detects the presence or absence of an attached battery, the type of battery, and the remaining battery level. The power supply control unit 80 also controls the DC-DC converter based on the detection results and instructions from the system control unit 50, and supplies predetermined voltages to various components including the recording medium 200 for predetermined periods. A power supply unit 30 includes a primary battery such as an alkali battery or a lithium battery, a secondary battery such as a nickel-cadmium (NiCd) battery, a nickel metal halide (NiMH) battery, or a lithium-ion (Li) battery, and/or an alternating current (AC) adaptor.

A recording medium interface (I/F) 18 is an interface with the recording medium 200. The recording medium 200 is a recording medium for recording captured images, such as a memory card or a hard disk. The recording medium 200 includes a semiconductor memory or a magnetic disk.

A communication unit 54 connects to an external device wirelessly or via a cable, and transmits and receives a video signal and an audio signal. The communication unit 54 can also connect to a wireless local area network (LAN) and the Internet. In addition, the communication unit 54 can communicate with an external device by Bluetooth (registered trademark) or Bluetooth (registered trademark) Low Energy communication. The communication unit 54 can transmit images captured by the imaging unit 22 (including an LV image) and images recorded in the recording medium 200, and can receive images and other various types of information from an external device.

An orientation detection unit 55 detects the orientation of the digital camera 100 with respect to the direction of gravity. Whether an image captured by the imaging unit 22 is one captured with the digital camera 100 held in landscape orientation or one captured with the digital camera 100 held in portrait orientation can be determined based on the orientation detected by the orientation detection unit 55. The system control unit 50 can add orientation information corresponding to the orientation detected by the orientation detection unit 55 to the image file of the image captured by the imaging unit 22, or rotate the image and record the rotated image. An acceleration sensor or a gyro sensor can be used as the orientation detection unit 55. The acceleration sensor or gyro sensor that is the orientation detection unit 55 can also be used to detect movement of the digital camera 100 (pan, tilt, lift-up, and whether being at rest).

The eye approach detection unit 57 is an eye approach detection sensor for detecting approach (eye approach) and separation (eye separation) of an eye (object) to/from the eyepiece unit 16 of the viewfinder (approach detection). The system control unit 50 switches whether to provide or hide display (switches between a display state and a hidden state) on the display unit 28 and the EVF 29, depending on the state detected by the eye contact detection unit 57. More specifically, suppose that at least the digital camera 100 is in an imaging standby state and the switching setting of the display device of the LV image captured by the imaging unit 22 is automatic switching setting. When no eye approach is made, the display device is switched to the display unit 28, and the display unit 28 provides display and the EVF 29 hides display. When an eye approach is made, the display device is switched to the EVF 29, and the EVF 29 provides display and the display unit 28 hides display. For example, the eye approach detection unit 57 can use an infrared proximity sensor, and can detect the approach of an object to the eyepiece unit 16 of the viewfinder where the EVF 29 is embedded. If an object approaches, infrared rays projected from a light projection part (not illustrated) of the eye approach detection unit 57 are reflected and received by a light reception part (not illustrated) of the infrared proximity sensor. How close the object has approached the eyepiece 16 (eye approach distance) can also be determined based on the amount of received infrared rays. In such a manner, the eye approach detection unit 57 performs eye approach detection to detect the approach distance of the object to the eyepiece unit 16. If the eyepiece unit 16 is in an eye non-approach state (non-approach state) and an object approaching the eyepiece 16 is detected within a predetermined distance, an eye approach is detected. If the eyepiece unit 16 is in an eye approach state (approach state) and the approach-detected object gets away from the eyepiece unit 16 by a predetermined distance or more, an eye separation is detected. The threshold for detecting an eye approach and the threshold for detecting an eye separation can be different, e.g., have a hysteresis. After an eye approach is detected, the eye approach state continues until an eye separation is detected. After an eye separation is detected, the eye non-approach state continues until an eye approach is detected. Note that the infrared proximity sensor is just an example, and other sensors capable of detecting the approach of an eye or object that can be regarded as an eye approach can be employed as the eye approach detection unit 57.

The touch panel 70a and the display unit 28 can be integrally configured. For example, the touch panel 70a is configured such that its light transmittance does not interfere with the display on the display unit 28, and attached onto the display surface of the display unit 28. The input coordinates of the touch panel 70a are then associated with the display coordinates on the display screen of the display unit 28. This can provide a graphical user interface (GUI) that enables the user to make operations as if directly operating the screen displayed on the display unit 28. The system control unit 50 can detect the following operations or states on/of the touch panel 70a:

That a finger or pen not touching the touch panel 70a newly touches the touch panel 70a. In other words, a start of a touch (hereinafter, referred to as a touch-down).

A state where a finger or pen is touching the touch panel 70a (hereinafter, referred to as a touch-on).

That a finger or pen touching the touch panel 70a moves (hereinafter, referred to as a touch-move).

That a finger or pen touching the touch panel 70a is released. In other words, an end of a touch (hereinafter, referred to as a touch-up).

A state where nothing touches the touch panel 70a (hereinafter, referred to as a touch-off).

If a touch-down is detected, a touch-on is simultaneously detected as well. After a touch-down, a touch-on usually continues to be detected unless a touch-up is detected. A touch-move is also detected in the state where a touch-on is detected. If a touch-on is detected and the touch position does not move, no touch-move is detected. A touch-off occurs if a touch-up is detected of all the finger(s) and pen touching the touch panel 70a.

The system control unit 50 is notified of such operations and states and the position coordinates where a finger or pen is touching the touch panel 70a via an internal bus. The system control unit 50 determines what operation (touch operation) is made on the touch panel 70a based on the notified information. In the case of a touch-move, the system control unit 50 can also determine the moving direction of the finger or pen moving on the touch panel 70a in terms of vertical and horizontal components on the touch panel 70a separately, based on a change in the position coordinates. If a touch-move made for a predetermined distance or more is detected, the system control unit 50 determines that a slide operation is made. An operation of quickly moving a finger touching the touch panel 70a for some distance and immediately releasing the finger will be referred to as a flick. In other words, a flick is an operation of quickly moving the finger on the touch panel 70a as if flicking. If a touch-move made for a predetermined distance or more at or above a predetermined speed is detected and a touch-up is immediately detected, a flick can be determined to be made (a flick can be determined to be made after a slide operation). Moreover, a touch operation of simultaneously touching a plurality of points (for example, two points) and bringing the touch positions close to each other will be referred to as a pinch-in. A touch operation of separating the touch positions from each other will be referred to as a pinch-out. A pinch-out and a pinch-in will be referred to collectively as pinch operations (or simply pinches). The touch panel 70a may be any one of various types of touch panels, including resistive, capacitive, surface acoustic wave, infrared, electromagnetic induction, image recognition, and optical sensor touch panels. Some types of touch panels detect a touch based on a contact on the touch panel, and some detect a touch based on approach of a finger or pen to the touch panels. Either may be used.

If a touch-move operation is made in the eye approach state, the user can set a method for specifying the position of a position index by a touch-move operation to either absolute position specification or relative position specification. Suppose, for example, that the position index is an AF frame. In the case of absolute position specification, an AF position corresponding to a touch position on the touch panel 70a (position where a coordinate input is made) is set when the touch panel 70a is touched. In other words, the position coordinates where the touch operation is made are associated with the position coordinates of the display unit 28. By contrast, in the case of relative position specification, the position coordinates where a touch operation is made are not associated with the position coordinates of the display unit 28. In relative position specification, the touch position is moved by a distance corresponding to the moving amount of the touch-move from the currently-set AF position in the moving direction of the touch-move regardless of the touch-down position on the touch panel 70a.

In the present exemplary embodiment, processing for controlling an AF pointer by a touch operation on the digital camera 100 will be described.

Figure 3A:
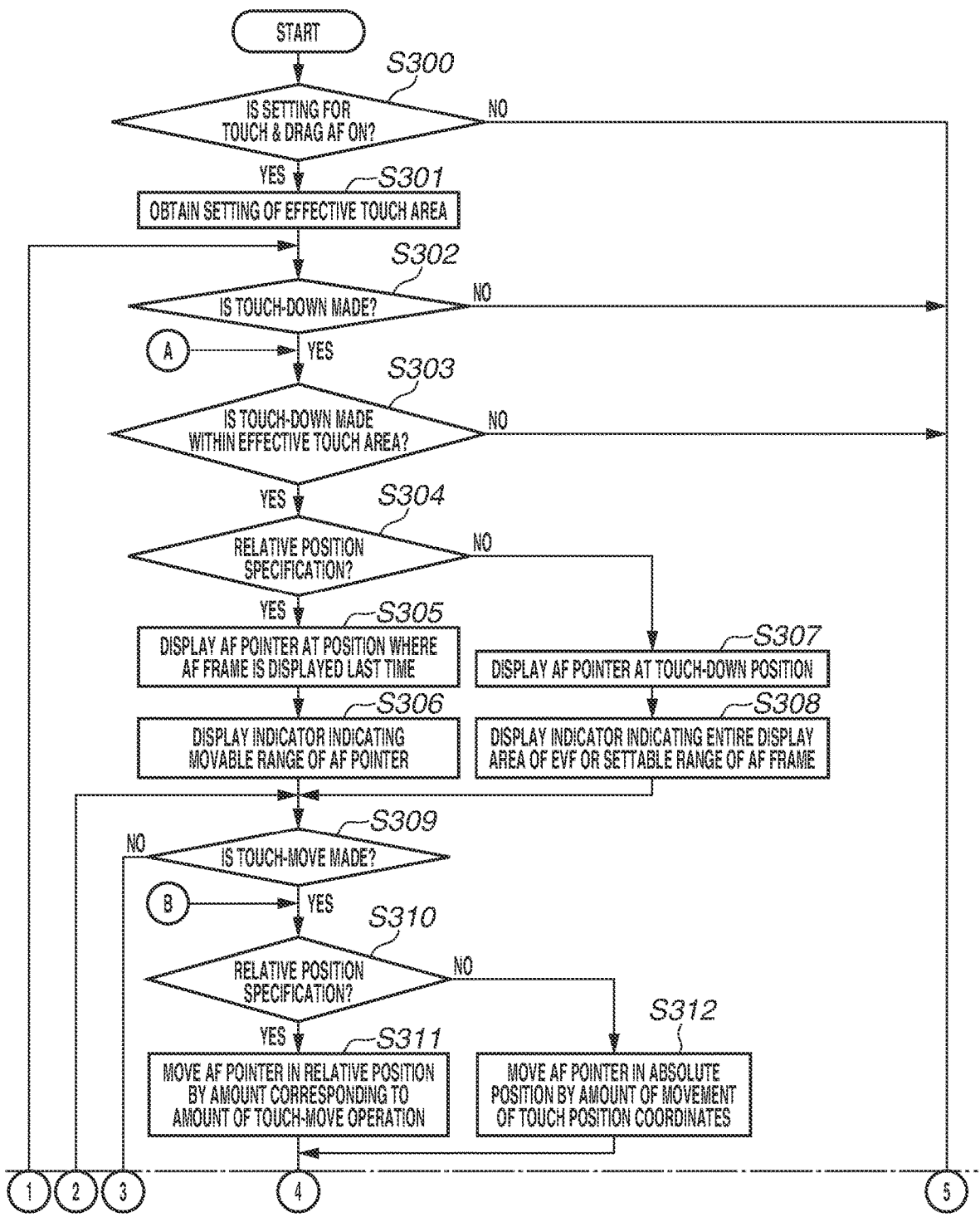
FIGS. 3A and 3B are a flowchart for controlling display of an automatic focus (AF) pointer displayed on an electronic viewfinder (EVF) by a touch operation according to one or more aspects of the present disclosure.
Figure 3B:
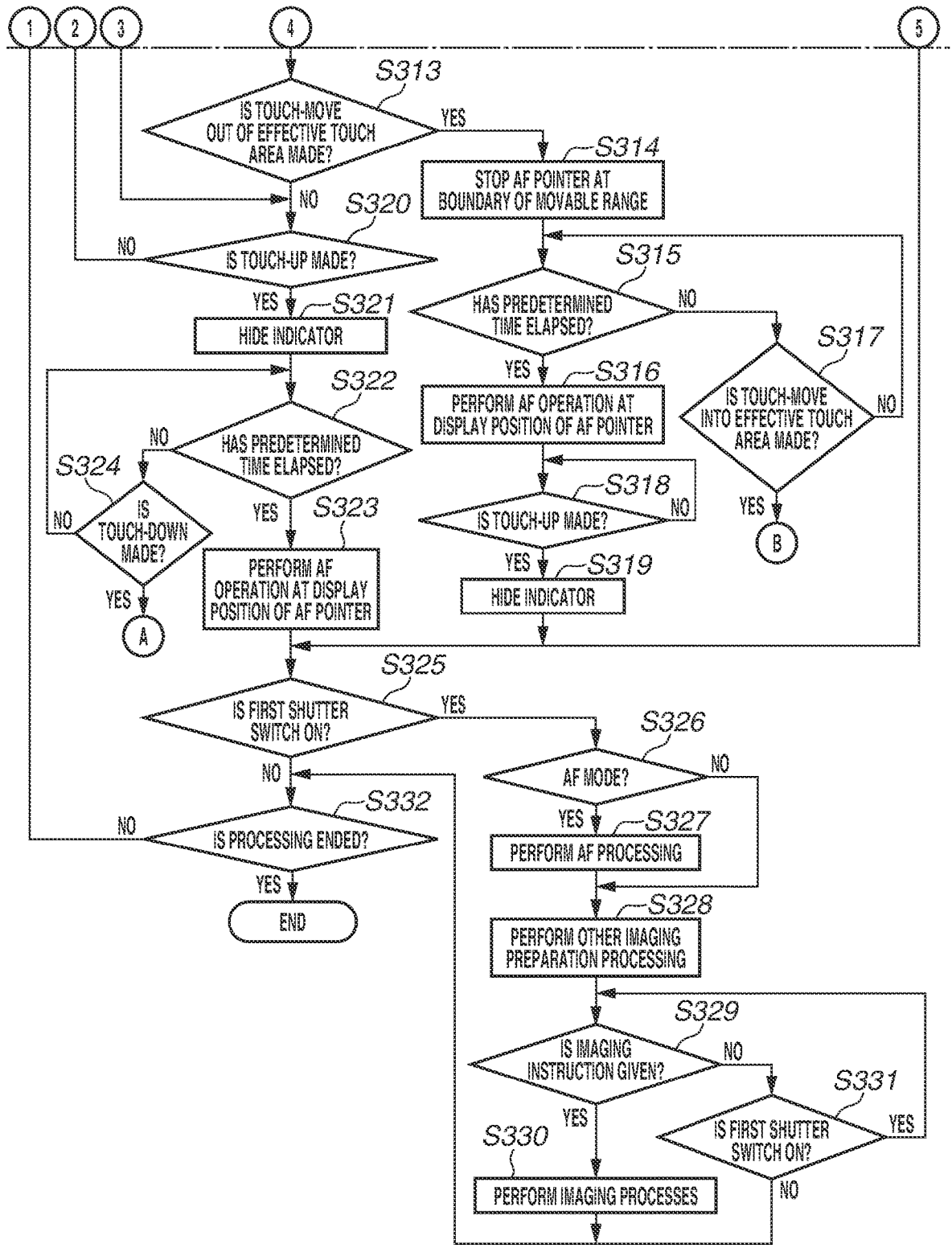

FIGS. 3A and 3B are a flowchart of control processing for displaying a movable range of the AF pointer when the user makes a touch operation on the touch panel 70a outside the viewfinder while looking into the viewfinder (making an eye approach to the eyepiece unit 16) according to the present exemplary embodiment. In the present exemplary embodiment, the AF pointer indicates a provisional position for determining an AF execution position (displaying the AF frame). Specifically, the AF pointer is represented by four indicators like an AF pointer 500 illustrated in FIG. 5A, so that the AF pointer looks like a circle. An AF frame (frame indicating a focus detection area) is displayed such that the four corners of a horizontally long rectangle are indicated with thick L shapes (not illustrated). An AF operation is not performed while the AF pointer is displayed. An AF operation is performed after the AF frame is displayed. The digital camera 100 implements such control processing by the system control unit 50 loading the program recorded in the nonvolatile memory 56 into the system memory 52 and executing the program. The flowchart of FIGS. 3A and 3B is started if the digital camera 100 is activated (powered on) in the imaging mode and the user looks into the viewfinder, i.e., makes an eye approach to the eyepiece unit 16 in the imaging standby state. The present exemplary embodiment facilitates the user to visually recognize the movable range where the AF pointer can be moved by a touch operation when the user operates the touch panel 70a while looking into the viewfinder.

In step S300, the system control unit 50 refers to the nonvolatile memory 56 and determines whether a setting for touch & drag AF is on. If the setting is on (YES in step S300), the processing proceeds to step S301. If the setting is off (NO in step S300), the processing proceeds to step S325. The touch & drag AF refers to a function of moving the AF pointer when the user makes a touch operation on the touch panel 70a while looking into the viewfinder. The setting for the touch & drag AF can be freely made by the user. If the setting for the touch & drag AF is on, the user can move the AF pointer to a desired position by making an eye approach to the eyepiece unit 16 and making a touch operation on the touch panel 70a while viewing the EVF 29. If the setting for the touch & drag AF is off, the position of the AF frame does not move based on a touch operation even when the user makes the touch operation on the touch panel 70a while viewing the EVF 29.

Figure 4:
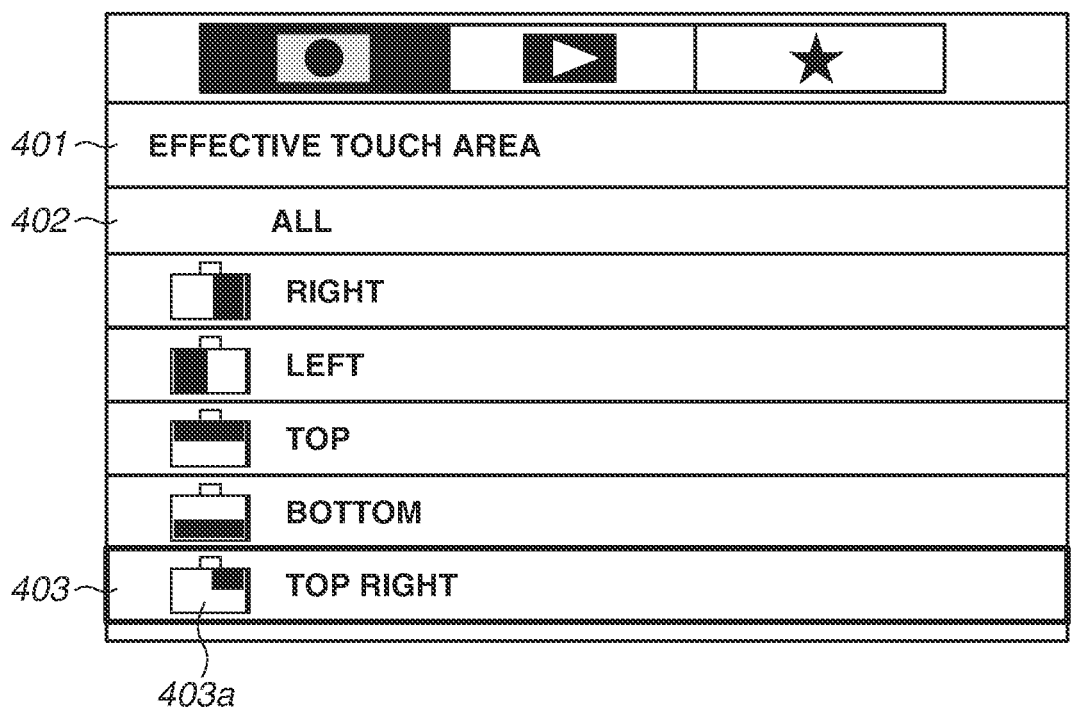
FIG. 4 illustrates a setting menu screen related to an effective touch area of a touch panel according to one or more aspects of the present disclosure.

In step S301, the system control unit 50 refers to the nonvolatile memory 56 and obtains a setting of an effective touch area. The effective touch area refers to an area where a touch operation is effective when the user makes the touch operation on the touch panel 70a. The effective touch area can be freely set on a setting menu screen illustrated in FIG. 4. The setting menu screen related to the effective touch area indicated by a setting item 401 displays possible candidates for area settings, such as a candidate 402 and a candidate 403. An icon 403a illustrates the area capable of touch operations on the touch panel 70a when the candidate 403 is set. Similar icons are also displayed for other respective candidates, not just for the candidate 403. Providing display like the icon 403a enables the user to visually recognize which part of the touch panel 70a can be operated if the displayed candidate is selected. FIG. 4 illustrates a situation where the setting of the effective touch area indicated by the setting item 401 is set to the candidate 403, i.e., the top right part of the touch panel 70a. If the effective touch area is the top right part of the touch panel 70a indicated by the candidate 403, the user can move the position of the AF pointer while gripping the grip unit 90 by the right hand with the right index finger on the shutter button 61, i.e., being ready for an imaging opportunity. This can reduce the possibility of the user's chances of missing an imaging opportunity. In addition, malfunction can be prevented from occurring even if the nose touches the areas other than the top right area of the touch panel 70a. The candidates for the setting item 401 are not limited to the right and left areas into which the touch panel 70a is vertically sectioned or the upper and lower areas into which the touch panel 70a is horizontally sectioned as illustrated in FIG. 4. Specifically, the touch panel 70a may be sectioned into four areas, and the candidates for the setting item 401 may include bottom right, top left, and bottom left candidates aside from the top right candidate 403. For example, if the area capable of touch operations is only the top right area of the touch panel 70a, the effective touch area can be too small for a user having big hands to smoothly move a finger. In such a case, the effective touch area can be set to the lower right area or the right area to facilitate finger movement for smooth movement of the AF pointer. Moreover, a left-handed user can operate the left half area of the touch panel 70a with a finger of the left hand more easily while gripping the grip unit 90 by the right hand with the right index finger on the shutter button 61.

In step S302, the system control unit 50 determines whether a touch-down is made on the touch panel 70a. If a touch-down is made (YES in step S302), the processing proceeds to step S303. If not (NO in step S302), the processing proceeds to step S325.

In step S303, the system control unit 50 determines whether the touch-down is made within the effective touch area. If the touch-down determined to be made in step S302 falls within the effective touch area (YES in step S303), the processing proceeds to step S304. If not (NO in step S303), the processing proceeds to step S325. In this step, the system control unit 50 makes the determination based on the setting of the effective touch area obtained in step S301 and the touch-down position obtained in step S302.

In step S304, the system control unit 50 refers to the nonvolatile memory 56 and determines the specification method of the touch & drag AF. If the specification method of the touch & drag AF is relative position specification (YES in step S304), the processing proceeds to step S305. If the specification method of the touch & drag AF is absolute position specification (NO in step S304), the processing proceeds to step S307.

In step S305, the system control unit 50 refers to the system memory 52 based on the touch-down made in step S302, and displays an AF pointer not at the touch-down position but at a position where the AF frame is displayed or an AF operation is performed last time.

In step S306, the system control unit 50 displays an indicator indicating a range where the AF pointer can be moved by the touch & drag AF. Based on the determination of step S304, the display position and size of the indicator displayed in this step change depending on the user's touch-down position on the touch panel 70a, the current display position of the AF frame displayed in response to the touch-down, and the setting of the effective touch area. A method for calculating the display position and size of the indicator will be described below with reference to FIGS. 5A, 5B, and 6A to 6C.

In step S307, the system control unit 50 displays the AF pointer at a position corresponding to the touch-down position of the touch-down made in step S302.

In step S308, the system control unit 50 displays an indicator indicating the entire display area of the EVF 29 or a settable range of the AF frame that is a part of the display area of the EVF 29. Since the specification method of the touch & drag AF is determined to be absolute position specification in step S304, the display position and size of the indicator displayed in this step do not change depending on the user's touch-down position, the display position of the AF frame, or the setting of the effective touch area. In other words, a predetermined (unchangeable) range is displayed as the indicator. The display position and size of the indicator here will be described below with reference to FIG. 5C. While in the present exemplary embodiment the indicator is displayed (in steps S306 or S308) in response to the touch-down made on the touch panel 70a in step S302, the display timing is not limited thereto. The indicator may be displayed in response to a touch-move operation on the touch panel 70a (step S309).

In step S309, the system control unit 50 determines whether a touch-move is made on the touch panel 70a. If a touch-move is made (YES in step S309), the processing proceeds to step S310. If not (NO in step S309), the processing proceeds to step S320.

In step S310, like step S304, the system control unit 50 determines the specification method of the touch & drag AF. If the specification method is relative position specification (YES in step S310), the processing proceeds to step S311. If the specification method is absolute position specification (NO in step S310), the processing proceeds to step S312.

In step S311, the system control unit 50 moves the AF pointer in relative position by an amount corresponding to the amount of touch-move operation made in step S309. In other words, the system control unit 50 moves the AF pointer by the amount corresponding to the amount of touch-move operation regardless of the position coordinates of the touch position. The amount corresponding to the amount of touch-move operation refers to an amount obtained by multiplying the amount of touch-move operation by a given coefficient, such as a (a: positive real number). The coefficient α can be freely set by the user. The behavior in step S311 will be described below with reference to FIG. 5B.

In step S312, the system control unit 50 moves the AF pointer in absolute position by the amount of movement of the touch position coordinates by the touch-move made on the touch panel 70a. In other words, the system control unit 50 moves the AF pointer as much as the position coordinates are moved by the touch-move. In step S312, unlike step S311, the AF pointer is moved by an amount corresponding to the position coordinates moved by the touch-move. Specifically, the system control unit 50 calculates the corresponding position coordinates based on a difference in scale between the effective touch area and the EVF 29, which is determined in calculating the indicator displayed in step S306, and moves the AF pointer. The behavior in step S312 will be described below with reference to FIG. 5C.

In step S313, the system control unit 50 determines whether a touch-move out of the effective touch area obtained in step S301 is made. If a touch-move out of the effective touch area is made (YES in step S313), the processing proceeds to step S314. If not (NO in step S313), the processing proceeds to step S320.

In step S314, the system control unit 50 stops the AF pointer at the boundary of the movable range. Specifically, suppose in FIG. 5A that a finger 520 moves from inside the area having vertices at points R0 to R3 (effective touch area) to outside the effective touch area across the side connecting points R0 and R1. In such a case, the AF pointer is stopped at the position when the AF pointer moves out of the area or immediately before the AF pointer moves out of the area. Specifically, in FIG. 5A, the AF pointer 500 is stopped within the movable range on the EVF 29, with a side of the AF pointer 500 in contact with the side connecting points S0 and S1. Since the AF pointer 500 does not move even if the user continues the touch-move outside the effective touch area, the user can find out that his/her own touch-move operation has exceeded the effective touch area.

In step S315, the system control unit 50 determines whether a predetermined time has elapsed since the stop of the AF pointer at the boundary of the movable range in step S314, i.e., the user's touch position moved out of the effective touch area. If the predetermined time has elapsed (YES in step S315), the processing proceeds to step S316. If not (NO in step S315), the processing proceeds to step S317.

In step S316, the system control unit 50 performs an AF operation at the display position of the AF pointer on the EVF 29. Since the AF pointer is stopped in steps S314 and S315, i.e., the user's touch position is outside the effective touch area, the movement of the AF pointer by the touch operation is considered to have ended, and the system control unit 50 performs the AF operation at the display position of the AF pointer. Changing a display mode here enables the user to visually recognize that the selection of the AF pointer has been ended (cancelled). The user can also determine whether to make a touch-up and make a touch-down within the effective touch area again to further move the AF pointer. In the case of a single-point AF where the AF setting is fixed to a point, the system control unit 50 performs the AF operation at the position where the AF frame (not illustrated) is displayed, and fixes the AF frame. If the AF setting is a tracking AF, the system control unit 50 determines a tracking target at the display position of the AF frame and starts tracking.

In step S317, the system control unit 50 determines whether a touch-move into the effective touch area is made. If a touch-move into the effective touch area is made (YES in step S317), the processing returns to step S310. If not (NO in step S317), the processing returns to step S315. Stopping the AF pointer at the boundary of the movable range in step S314 enables the user to find out that the touch-move operation on the touch panel 70a has exceeded the effective touch area. Therefore, it is conceivable that the user brings back the touch-move operation into the effective touch area.

In step S318, the system control unit 50 determines whether a touch-up from the touch panel 70a is made. If a touch-up is made (YES in step S318), the processing proceeds to step S319. If not (NO in step S318), the processing returns to step S318.

In step S319, the system control unit 50 hides the indicator displayed in step S306. Hiding the indicator in response to the touch-up can reduce the user's annoyance in observing the LV image displayed on the EVF 29, such as an LV image 521 in FIG. 5A. This can also eliminate the user's confusion about why the movable range of a touch operation is displayed in the absence of a touch operation.

In step S320, like step S318, the system control unit 50 determines whether a touch-up from the touch panel 70a is made. If a touch-up is made (YES in step S320), the processing proceeds to step S321. If not (NO in step S320), the processing returns to step S309.

In step S321, like step S319, the system control unit 50 hides the indicator displayed in step S306.

In step S322, the system control unit 50 determines whether a predetermined time has elapsed since the touch-up. If a predetermined time has elapsed (YES in step S322), the processing proceeds to step S323. If not (NO in step S322), the processing proceeds to step S324. The predetermined time in step S322 may be the same as or different from that in step S315.

In step S323, the system control unit 50 performs an AF operation at the display position of the AF pointer displayed on the EVF 29.

In step S324, like step S302, the system control unit 50 determines whether a touch-down is made on the touch panel 70a. If a touch-down is made (YES in step S324), the processing returns to step S303. If not (NO in step S324), the processing returns to step S322.

In step S325, the system control unit 50 determines whether the shutter button 61 is half-pressed, i.e., the first shutter switch 62 is on. If the first shutter switch 62 is on (YES in step S325), the processing proceeds to step S326. If not (NO in step S325), the processing proceeds to step S332.

In step S326, the system control unit 50 determines whether a focus mode is set to an AF mode. If the focus mode is set to the AF mode (YES in step S326), the processing proceeds to step S327. If not (NO in step S326), the processing proceeds to step S328.

In step S327, the system control unit 50 performs AF processing based on the position where the AF operation is performed in step S316 or S323 (display position of the AF pointer). In the case of a single-point AF where the AF setting is fixed to a point, the AF operation is performed at the position where the AF frame (not illustrated) is displayed.

In step S328, the system control unit 50 performs other imaging preparation processing such as AE processing and AWB processing.

In step S329, the system control unit 50 determines whether an imaging instruction is given. If an imaging instruction is given (YES in step S329), the processing proceeds to step S330. If not (NO in step S329), the processing proceeds to step S331. The imaging instruction refers to the turning-on of the second shutter switch 64 (i.e., a full-press on the shutter button 61) or a touch operation on an imaging button displayed on the display unit 28.

In step S330, the system control unit 50 performs a series of imaging processes up to recording of a captured image into the recording medium 200 as an image file. Note that the system control unit 50 also performs the imaging processes if an imaging instruction is given in the imaging standby state, even in the middle of the control flowchart of FIGS. 3A and 3B (i.e., in steps other than step S330). Similarly, the system control unit 50 enters the imaging standby state if the shutter button 61 is operated in a state other than the imaging standby state.

In step S331, the system control unit 50 determines whether the shutter button 61 remains being half-pressed, i.e., the first shutter switch 62 remains on. If the first shutter switch 62 is on (YES in step S331), the processing returns to step S329. If not (NO in step S331), the processing proceeds to step S332.

In step S332, the system control unit 50 determines whether the processing is ended. If the processing is ended (YES in step S332), the control flowchart of FIGS. 3A and 3B ends. If not (NO in step S332), the processing returns to step S302. That the processing is ended refers to, for example, that the imaging mode has transitioned to a playback mode (playback screen for playing back images) or that the digital camera 100 is powered off.

Figure 5A:
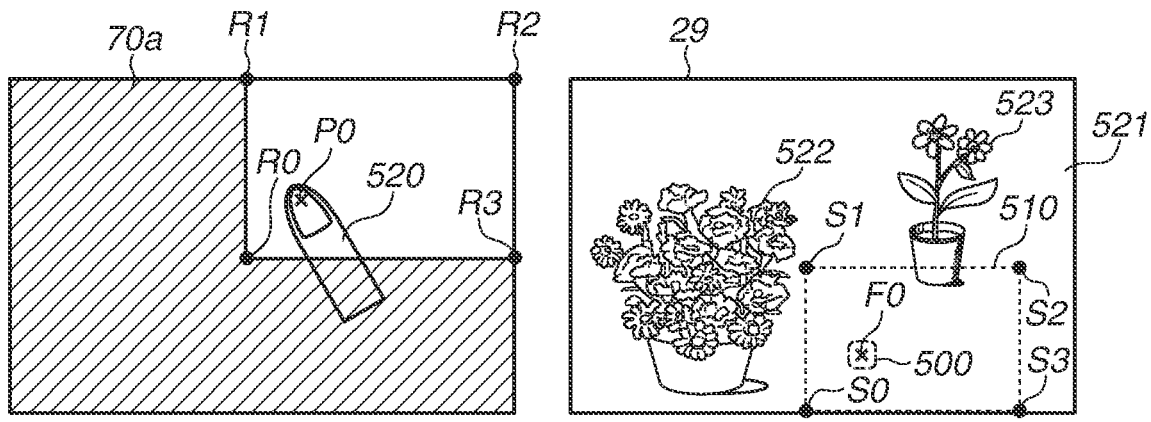
FIGS. 5A to 5C are diagrams illustrating operation examples of the touch panel and display examples of the EVF according to one or more aspects of the present disclosure.
Figure 5B:
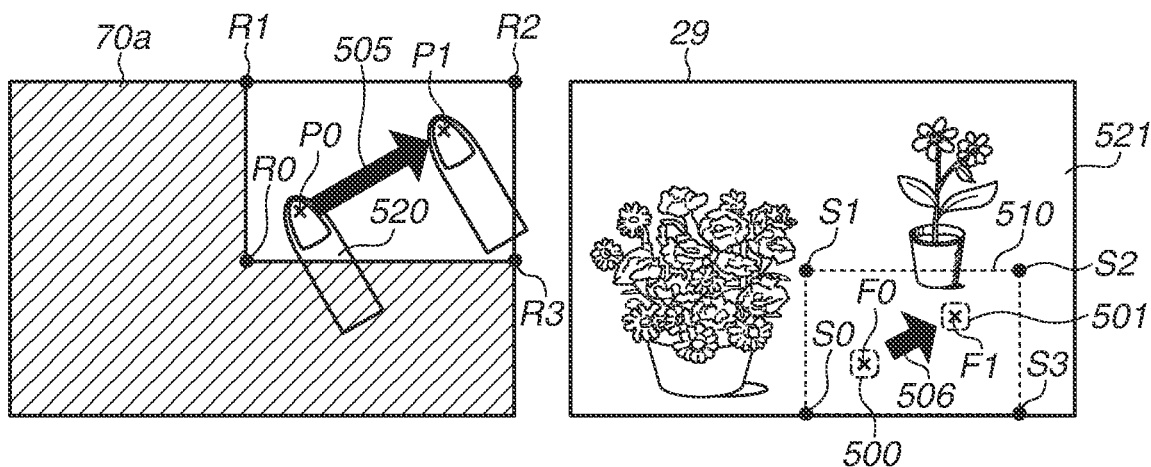
Figure 5C:
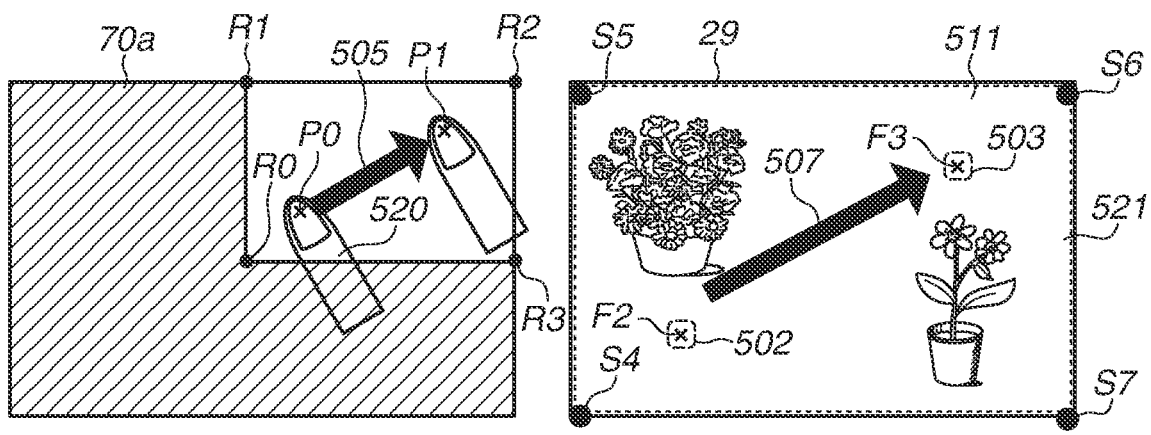

FIGS. 5A to 5C illustrate display examples of the range capable of touch operations when the user makes a touch operation while looking into the viewfinder according to the present exemplary embodiment. FIGS. 5A to 5C illustrate display examples where the effective touch area is set to the top right area as illustrated in FIG. 4. FIGS. 5A and 5B illustrate display examples where the specification method of the position of the position index corresponding to the touch operation on the touch panel 70a is relative position specification. FIG. 5C illustrates a display example where the specification method of the position of the position index corresponding to the touch operation on the touch panel 70a is absolute position specification.

In FIGS. 5A to 5C, the area of the touch panel 70a other than the effective touch area (where instructions are unable to be given by touch operations) is shown with hatching. The EVF 29 displays the LV image 521, and an object 522 and an object 523.

FIG. 5A illustrates a display example of the AF pointer and the indicator displayed on the EVF 29 when a touch-down is made by the user on the touch panel 70a in step S302 of FIG. 3A (YES in step S302 of FIG. 3A). Points R0 to R3 illustrated on the touch panel 70a of FIG. 5A represent the four vertices of the effective touch area described above with reference to FIGS. 3A and 3B. In the present exemplary embodiment, the effective touch area is set to the top right area (candidate 403 in FIG. 4). The coordinates of the four vertices are as follows:

Point R0: (Xr0, Yr0),
Point R1: (Xr0, Yr1),
Point R2: (Xr1, Yr1), and
Point R3: (Xr1, Yr0).

The position of the touch-down made with the finger 520 on the touch panel 70a of FIG. 5A (touch-down in step S302 or S324 of FIGS. 3A and 3B) will be referred to as point P0, which is expressed as:
Point P0: (Xp0, Yp0).

Since point P0 falls within the effective touch area (within the area having vertices at points R0 to R3), $Xr0 \leq Xp0 \leq Xr1$ and $Yr0 \leq Yp0 \leq Yr1$.

An indicator 510 indicating the movable range of the AF pointer is displayed on the EVF 29 of FIG. 5A. The four vertices of the area constituting the indicator 510 will be referred to as points S0 to S3. The position of the AF pointer displayed in response to the touch-down made by the user (step S305 of FIG. 3A) will be referred to as point F0, which is expressed as:
Point F0: (Xf0, Yf0).

The AF pointer 500 is displayed as a circle about point F0. In the present exemplary embodiment, the AF pointer 500 is not displayed as a closed circle, but is displayed such that the circle is represented by only four segments. However, the display mode is not limited thereto. Since the specification method of the position corresponding to the touch operation in FIG. 5A is relative position specification as described above, point P0 representing the touch-down position of the user and point F0 for displaying the AF pointer 500 on the EVF 29 in response to the touch-down do not have a relationship in position. In other words, the position of the AF pointer 500 displayed on the EVF 29 does not depend on the position coordinates of the touch-down position. In the case of relative position specification, the AF pointer 500 displayed in response to the user's touch-down is displayed at the previous position of the AF pointer 500 or the previous AF execution position, stored in the system memory 52.

Suppose that the user makes a touch-move operation from point P0 on the touch panel 70a of FIG. 5A (YES in step S309 of FIG. 3A). The amount of touch-move operation on the touch panel 70a here will be denoted by (ΔXr, ΔYr), and the amount movement of the AF pointer 500 moved by the amount of touch-move operation will be denoted by (ΔXf, ΔYt). The relationship between the amounts of movement can be expressed as:

$$\Delta Xf = kx \times \Delta Xr, \text{ and}$$

$$\Delta Yf = ky \times \Delta Yr,$$

where kx and ky are positive real numbers. kx and ky may be set by the user on the setting menu screen. kx and ky may be predetermined values. If kx and ky are less than 1 in value, the amount of movement of the displayed AF pointer 500 becomes small compared to the amount of touch-move operation. For example, the AF pointer 500 will not move from one end to the other of the displayed range even if the user makes a touch-move operation from one end to the other of the touch panel 70a. On the other hand, if kx and ky are greater than 1 in value, a small touch-move operation moves the AF pointer 500 greatly. For example, the AF pointer 500 displayed on the EVF 29 can be moved from one end to the other of the indicator 510 by the amount of touch-move operation as much as from one end to near the center of the touch panel 70a.

If a touch-move operation is made from point P0 to point R0 on the touch panel 70a, the AF pointer 500 moves from point F0 to S0 on the EVF 29. Similarly, if a touch-move operation is made from point P0 to points R1, R2, and R3, the AF pointer 500 moves from point F0 to points S1, S2, and S3, respectively. In other words, from the calculation formula of the relationship between the amount of touch-move operation and the amount of movement of the AF pointer 500, the position coordinates of points S0 to S3 are determined as follows:
Point S0: (Xf0−kx×(Xp0−Xr0), Yf0−ky×(Yp0−Yr0)),
Point S1: (Xf0−kx×(Xp0−Xr0), Yf0−ky×(Yp0−Yr1)),
Point S2: (Xf0−kx×(Xp0−Xr1), Yf0−ky×(Yp0−Yr1)), and
Point S3: (Xf0−kx×(Xp0−Xr1), Yf0−ky×(Yp0−Yr0)).

The indicator 510 is displayed based on these position coordinates.

The indicator 510 having vertices at points S0 to S3 visually indicates how far the user can make a touch-move operation on the touch panel 70a. In other words, the indicator 510 indicates the movable range of the AF pointer 500 by a single touch-move operation from when a touch is made on the touch panel 70a to when the touch is released. For example, suppose, as illustrated in FIG. 5A, that a touch-down is made on point P0 on the touch panel 70a. In such a case, the AF pointer 500 is displayed at the position of point F0 on the EVF 29, and the indicator 510 is displayed as well. Displaying the indicator 510 enables the user to visually recognize that the finger 520 can make a large touch-move toward point R2 on the touch panel 70a and cannot make a large touch-move toward point R0. If a touch-down is made on point P0 on the touch panel 70a, the AF pointer 500 is displayed at point F0 on the EVF 29. Point F0 is close to the side connecting points S0 and S1 of the indicator 510, from which it can be seen that the AF pointer 500 is unable to be moved up to the object 522 in the LV image 521 by a touch-move operation starting with the current touch-down. In such a manner, the user, when making a touch-down, can determine whether a touch-down is desirably made again at a different position to move the AF pointer 500 from the current touch-down position to a desired position.

Moreover, as determined above, the position coordinates of points S0 to S3 that are the vertices of the indicator 510 change depending on several conditions in making a touch-down on the touch panel 70a, and the display position of the indicator 510 changes with the change in the position coordinates. Specifically, the several conditions are the following three: the position coordinates of a touch-down made on the touch panel 70a, the position coordinates of the respective vertices of the set effective touch area, and the position coordinates of the AF pointer 500 displayed on the EVF 29 in response to the touch-down (i.e., the position of the AF frame before the touch-down). If at least one set of the position coordinates changes, the display position changes. In the present exemplary embodiment, the indicator 510 is displayed as a rectangle having vertices at points S0 to S3. However, the display method is not limited thereto, as long as the user can identify the indicator 510. For example, the rectangle can be filled with semitransparent color, instead of the rectangular being drawn by straight lines. The range can be indicated by displaying only L-shaped figures at the four vertices.

If the X coordinates or Y coordinates of points S0 and S3 calculated by the foregoing calculation formula are less than 0, the less-than-zero coordinates are corrected to 0. In other words, depending on the relationship between the position of the touch-down made by the user on the touch panel 70a and the display position of the AF pointer 500, the indicator 510 may sometimes not have a shape based on the effective touch area of the touch panel 70a. Correcting the indicator 510 enables the user to find out how far a touch-move can be made from the current touch-down position, and, in a case where the display position of the AF pointer 500 is close to the boundary of the indicator 510, that the range capable of a touch-move is narrow. The user can then make a touch-down again if a large touch-move operation is intended. If the display position of the AF pointer 500 is far from the border of the indicator 510, the user can find out that a large touch-move operation can be made.

FIG. 5B illustrates a display example of the movement of the AF pointer 500 displayed on the EVF 29 when the user makes a touch-move operation on the touch panel 70a in step S311 of FIG. 3A.

FIG. 5B illustrates a case where the user makes a touch-move operation from point P0 to point P1 on the touch panel 70a. The position coordinates of point P1 are:
Point P1: (Xp1, Yp1).

The amount of movement by the touch-move operation here can be expressed as:

$\Delta Xp = Xp1 - Xp0$, and $\Delta Yp = Yp1 - Yp0$.

If the touch-move operation from point P0 to point P1 is made, the AF pointer moves from point F0 to point F1 on the EVF 29. By applying the amount of movement to the foregoing calculation formula by which the indicator 510 is calculated, the position coordinates of point F1 can be expressed as:
Point F1: (Xf+kx×(Xp1−Xp0), Yf0+ky×(Yp1−Yp0)).

The AF pointer is moved to the determined position coordinates of point F1. As described above, in FIGS. 5A and 5B, the position specification method by a touch operation is relative position specification. The amount of touch-move operation 505 on the touch panel 70a in FIG. 5B is therefore not the same as the amount of movement 506 of the AF pointer on the EVF 29. Meanwhile, the positional relationship between the AF pointer 500 displayed in response to the touch-down made in step S302 of FIG. 3A and the indicator 510 calculated by the foregoing calculation formula and displayed in step S306 of FIG. 3A does not change. The reason is that the relative position relationship between the AF pointer 500 and the indicator 510 during a touch-move remains unchanged unless a touch-up is made.

If the user ends the touch-move at point P1 on the touch panel 70a of FIG. 5B and makes a touch-up, the indicator 510 is hidden in response to the touch-up (step S321 of FIG. 3B). An AF pointer 501 continues to be displayed at point F1 on the EVF 29 of FIG. 5B for a predetermined time. After a lapse of a predetermined time, the display mode is changed and an AF operation is performed (step S323 of FIG. 3B). If the user makes a touch-down on the touch panel 70a again, the system control unit 50 displays the AF pointer and the indicator indicating the movable range of a touch-move to notify the user of the range capable of a moving operation. This can reduce the user's chances of making a touch-move out of the effective touch area of the touch panel 70a, and reduce the possibility of an AF operation being performed at a position not intended by the user. Since the movable range of the AF pointer is displayed each time the user makes a touch-down on the touch panel 70a, the user can eventually find out roughly what part of the effective touch area of the touch panel 70a is being touched. This can reduce the possibility of an AF operation being performed against the user's intention.

FIG. 5C illustrates an operation example of the touch panel 70a and a display example of the EVF 29 in a case where the effective touch area of the touch panel 70a is set to the top right area and the position specification method by a touch operation is set to absolute position specification. The position coordinates of the touch-down and the position coordinates of the touch-move on the touch panel 70a illustrated in FIG. 5C are the same as those on the touch panel 70a illustrated in FIG. 5B. If the user makes a touch-move operation from point P0 to point P1 on the touch panel 70a of FIG. 5C, the AF pointer moves from point F2 to point F3 on the EVF 29. That is to say, an AF pointer 502 moves to an AF pointer 503 by the touch-move operation from point P0 to point P1. The range capable of a touch moving operation here is represented by the area having vertices at points S4 to S7. Since the position specification method by a touch operation in FIG. 5C is absolute position specification, the area represented by points S4 to S7 is the entire display area of the EVF 29. In the present exemplary embodiment, the AF pointer can be moved (AF operation can be performed) over the entire display area of the EVF 29, and the area represented by points S4 to S7 is thus the entire display area of the EVF 29. However, this is not restrictive. Specifically, if the movable range of the AF pointer (range selectable by the AF pointer) is an area smaller than the display area of the EVF 29, the area to be represented by points S4 to S7 is made accordingly smaller than the display area of the EVF 29. Since the position specification method of the position coordinates is absolute position specification, the coordinates of the touch position correspond in position to the coordinates of the display position of the AF pointer. The area having vertices at points R0 to R3 and the area having vertices at points S4 to S7 are in different scales. The system control unit 50 therefore calculates a scale in which point R0 agrees with point S4, point R1 with point S5, point R2 with point S6, and point R3 with point S7, calculates the position of the AF pointer corresponding to the touch position, and displays the AF pointer. Assuming that the vertices of the effective touch area of the touch panel 70a are points R4 to R7, the position coordinates of points R4 to R7 can be expressed as follows:
Point R4: (Xr4, Yr4),
Point R5: (Xr4, Yr5),
Point R6: (Xr5, Yr5), and
Point R7: (Xr5, Yr4).

Suppose that the entire range where the AF frame can be set on the EVF 29 (in the present exemplary embodiment, the entire display area of the EVF 29) has a width of Xe and a height of Ye. In such a case, the position coordinates of points S4 to S7 are given by:
Point S4: (0, 0),
Point S5: (0, Ye),
Point S6: (Xe, Ye), and
Point S7: (Xe, 0).

Since the position specification method by a touch operation in FIG. 5C is absolute position specification, the position coordinates of points S4 to S7 define the predetermined range as described above. In other words, unlike points S0 to S3 or the range defined by points S0 to S3 in FIGS. 5A and 5B, points S4 to S7 and the range defined by points S4 to S7 are uniquely determined by the size of the EVF 29 without using the calculation formula. The position coordinates of points F2 and F3 illustrated on the EVF 29 in FIG. 5C can thus be expressed as:
Point F2: $((Xp0-Xr4) \times Xe/(Xr5-Xr4), (Yp0-Yr0) \times Ye/(Yr5-Yr0))$, and
Point F3: $((Xp1-Xr4) \times Xe/(Xr5-Xr4), (Yp1-Yr0) \times Ye/(Yr5-Yr0))$.

The amount of touch-move operation 505 on the touch panel 70a in FIG. 5C is not the same as the amount of movement 507 of the AF pointer on the EVF 29. Even if the position specification method by a touch operation is set to absolute position specification, an indicator 511 indicating the range capable of touch moving operations is displayed. As described above, the range indicated by the indicator 511 agrees with the entire display area of the EVF 29. Displaying the indicator 511 enables the user to visually recognize that a touch operation on the touch panel 70a is made by absolute position specification. By repeating touch operations, the user can thus eventually intuitively find out which position on the touch panel 70a corresponds to which position on the EVF 29 without directly observing the touch panel 70a. This increases the likelihood that the user can specify a desired position with higher accuracy.

While the coefficients kx and ky are described to be settable by the user or set in advance, the system control unit 50 may change the coefficients kx and ky based on information about the lens unit 150 connected to the digital camera 100. For example, the system control unit 50 can be configured to reduce the values of the coefficients kx and ky if the connected lens unit 150 is a telescopic lens. Some telescopic lenses to be connected have a narrower range of distance measurement points selectable by the user than those of normal and wide-angle lenses. If such a telescopic lens is used with normal area settings before the area of distance measurement points becomes narrow, fine selection of a distance measurement point can be difficult. Since finer selection of a distance measurement point, i.e., finer movement of the AF pointer is desirable, the amount of movement of the AF pointer with respect to the amount of touch-move operation can be reduced for improved usability.

Figure 6A:
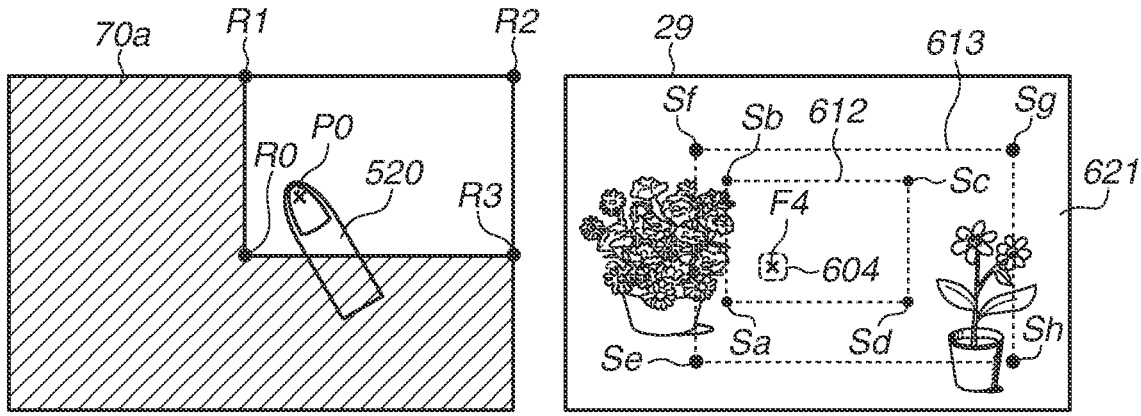
FIGS. 6A to 6C are diagrams illustrating modifications of the operation examples of the touch panel and the display examples of the EVF according to one or more aspects of the present disclosure.
Figure 6B:
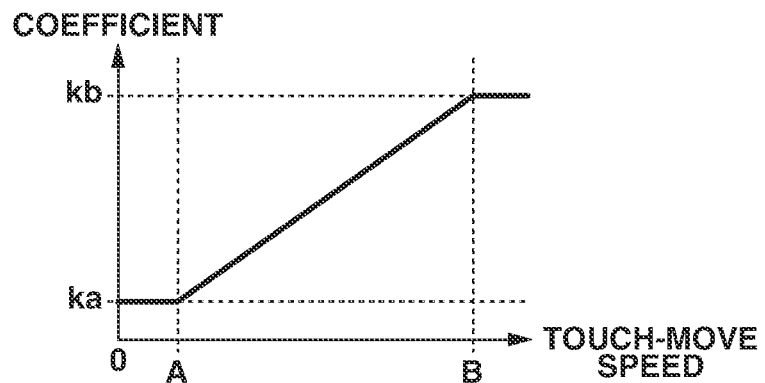
Figure 6C:
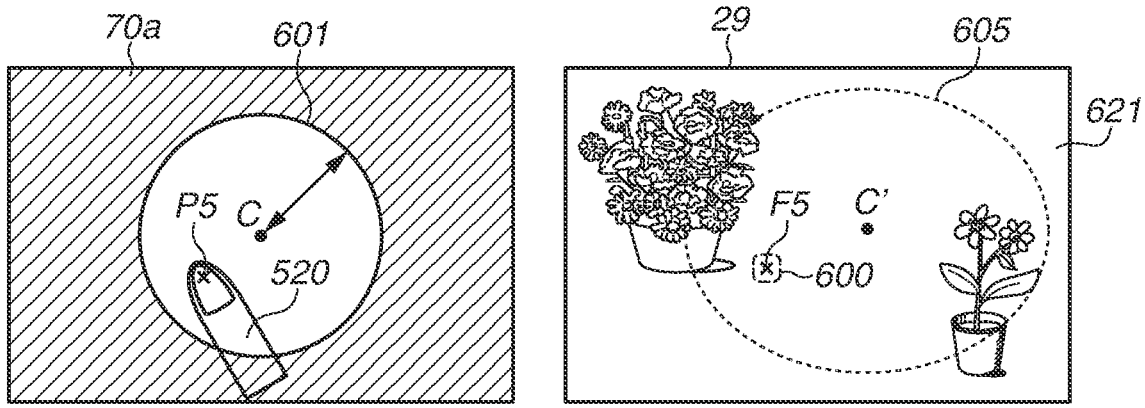

The values of the coefficients kx and ky may be changed depending on the operation speed of the touch-move operation. Specifically, if the speed of the touch-move operation is high, the system control unit 50 increases the values of the coefficients kx and ky to increase the amount of movement of the AF pointer since the user is considered to intend to move the AF pointer largely and quickly. On the other hand, if the speed of the touch-move operation is low, the system control unit 50 reduces the values of the coefficients kx and ky since the user is considered to intend to carefully make fine adjustments to the AF pointer. A specific example will now be described with reference to FIGS. 6A to 6C. In FIGS. 6A and 6C, an LV image 621 is displayed on the EVF 29.

FIG. 6A illustrates point P0 representing a touch-down position of the user and point F4 for displaying the AF pointer 604 on the EVF 29 in response to the touch-down do not have a relationship in position. This point P0 has the same position coordinates as those of point P0 in FIG. 5A. If the user makes a touch-down on point P0, an indicator 612 is displayed on the EVF 29 as illustrated in FIG. 6A. Since only a touch-down is made in FIG. 6A, the speed of a touch-move operation (touch-move speed) in the graph of FIG. 6B is 0 and the coefficients kx and ky are ka. The system control unit 50 determines points Sa to Sd and the indicator 612 by the foregoing calculation method, using the coefficients kx and ky=ka. If the user starts a touch-move, the system control unit 50 determines the coefficients kx and ky based on the touch-move speed and the graph of FIG. 6B, and changes the size of the indicator based on the determined coefficients kx and ky.

If the touch-move speed is 0 to A (lower than or equal to A), the coefficients kx and ky are ka from the graph of FIG. 6B. The indicator is thus the same as when only a touch-down is made (indicator 612 in FIG. 6A).

If the touch-move speed is between A and B (higher than A and lower than B), the system control unit 50 changes the coefficients kx and ky based on the proportional line in the graph of FIG. 6B, and changes the indicator. With the touch-move speed of between A and B (higher than A and lower than B), the size of the indicator is changed between that of the indicator 612 and that of an indicator 613.

If the touch-move speed is higher than or equal to B, the coefficients kx and ky are kb from the graph of FIG. 6B, and the indicator 613 is displayed. The system control unit 50 determines points Se to Sh and calculates the indicator 613 as with the indicator 612.

The user's needs to move the AF pointer largely and quickly and to make fine adjustments to the AF pointer can be met by changing the movable range of the AF pointer depending on the touch-move speed, using the coefficients kx and ky determined based on the graph of FIG. 6B. This can further improve operability.

FIG. 6C illustrates a display example in a case where the effective touch area of the touch panel 70a is circular. The left half of FIG. 6C illustrates an example of a touch operation on the touch panel 70a, and the right half of FIG. 6C a display example of an indicator on the EVF 29. The effective touch area obtained in step S301 is a circle about point C (Xc, Yc) with a radius of r, represented by an area 601. Suppose that the touch coordinates of the touch-down made in step S302 are:
Point P5: (Xp5, Yp5), and
the position coordinates determined from the touch-down are:
Point F5: (Xf5, Yf5).

The system control unit 50 displays an index 600 that is an AF pointer on the EVF 29 based on point F5. The system control unit 50 determines an indicator 605 indicating the movable range of the AF pointer 600, displays the indicator 605 on the EVF 29, and determines the movement of the AF pointer 600 based on the touch-move, using the calculation formula described above with reference to FIGS. 5A to 5C. The indicator 605 has an elliptic shape, the center of which is located at:
point C': (Xf5+kx×(Xc−Xp5), Yf5+ky×(Yc−Yp5)),
with a major axis that is parallel to the X-axis and has a major radius of kx×r, and a minor axis that is parallel to the Y-axis and has a minor radius of ky×r (where kx>ky>0). In such a manner, an indicator can be generated even if the effective touch area is a closed figure other than a rectangle. In FIG. 6C, the indicator 605 is configured as an ellipse long in the X-axis direction for improved operability, taking into account the laterally long shapes of both the touch panel 70a and the EVF 29 and the mobility of human fingers with the digital camera 100 held in hand. However, the indicator 605 is not limited to the elliptical shape and may be circular.

The present exemplary embodiment is also applicable to a case where a device for detecting operations only in one direction, such as a linear touch operation member (line touch sensor), is used. The method for determining the touch-down position and the indicator to be displayed described above with reference to FIGS. 5A to 5C can be applied to a line touch sensor by setting the position coordinate in the Y-axis direction to 0.

In the present exemplary embodiment, AF-related processing is described to be controlled by touch operations on the touch panel 70a. However, other processing, such as AE- and AWB-related processing, may be made controllable by touch operations on the touch panel 70a.

If the user operates the touch panel 70a without looking into the viewfinder (without an eye approach to the eyepiece unit 16 being detected by the eye approach detection unit 57), the indicator indicating the movable range of the AF pointer is not displayed on the EVF 29. The reason is that the indicator does not need to be displayed, since the user not looking into the viewfinder can directly visually recognize the touch panel 70a.

As described with reference to FIGS. 3A and 3B, 5A to 5C, and 6A to 6C, the movable range of the AF pointer corresponding to the effective touch area of the touch panel 70a set by the user is displayed on the EVF 29 based on the user's touch operations on the touch panel 70a. When operating the touch panel 70a while looking into the EVF 29, the user can thus visually recognize the movable range of the AF pointer corresponding to the effective touch area on the EVF 29 without visually recognizing the touch panel 70a. The user can thus find out how far a touch-move can be made from a touch-down position when the touch-down is made. Since the movable range of the AF pointer is displayed each time the user makes a touch-down or touch-move, visually recognizing the movable range repeatedly increases the possibility that the user can roughly find out the size of the effective touch area set by the user himself/herself. This facilitates the user operating the touch panel 70a while looking into the viewfinder to find out the movable range of the AF pointer by touch operations, and improves operability.

The foregoing various controls described to be performed by the system correction unit 50 may be performed by a single piece of hardware. A plurality of pieces of hardware (such as a plurality of processors or circuits) may control the entire apparatus by sharing processing.

While the exemplary embodiment of the present disclosure has been described in detail, the present disclosure is not limited to this specific exemplary embodiment, and various other modes not departing from the gist of the present disclosure are also included in the present disclosure. The foregoing exemplary embodiment is merely one embodiment of the present disclosure.

The foregoing exemplary embodiment of the present disclosure has been described to be applied to a digital camera. However, this is not restrictive, and the exemplary embodiment of the present disclosure is applicable to any electronic device capable of display control by moving operations. Specific examples of the device to which the exemplary embodiment can be applied include a personal computer, a personal digital assistant (PDA), a mobile phone terminal, a portable image viewer, a printer apparatus including a display, a digital photo frame, a music player, a game machine, and an electronic book reader.

Other Exemplary Embodiments

An exemplary embodiment of the present disclosure can also be implemented by performing the following processing. The processing includes supplying software (program) for implementing the functions of the foregoing exemplary embodiment to a system or an apparatus via a network or various storage media, and reading and executing the program code by a computer (or CPU or micro processing unit (MPU)) of the system or apparatus. In such a case, the program and the storage media storing the program constitute the present exemplary embodiment.

An exemplary embodiment of the present disclosure can facilitate the user to find out a range capable of touch operations.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-063832, filed Mar. 31, 2020, which is hereby incorporated by reference herein in its entirety.

What is claimed is:

1. An electronic apparatus comprising
at least one memory and at least one processor which function as:
a touch detection unit configured to detect a touch operation on an operation surface;
a control unit configured to, in a case where a moving operation for making a touch on the operation surface and moving the touch is made in a first area of the operation surface, control movement of a selection position displayed on a display unit by an amount corresponding to the moving operation, and in a case where the moving operation is made in a second area of the operation surface, the second area adjoining the first area, perform control such that the movement of the selection position is not performed; and
a display control unit configured to, in a case where a predetermined touch operation is made in the first area, perform control to display an indicator indicating a movable range of the selection position by the moving operation on the display unit regardless of a distance from a border between the first and second areas to a touch position of the predetermined touch operation.

2. The electronic apparatus according to claim 1, wherein the indicator indicates a movable range of the selection position by a single touch operation on the operation surface.

3. The electronic apparatus according to claim 1, wherein the indicator has a shape based on the first area.

4. The electronic apparatus according to claim 1, wherein the display control unit is configured to perform control to display the indicator at a different position depending on a condition in the case where the predetermined touch operation is made.

5. The electronic apparatus according to claim 1, wherein the display control unit is configured to perform control to display the indicator at a different position depending on a position at which a touch of the touch operation is started.

6. The electronic apparatus according to claim 1,
wherein the at least one memory and the at least one processor further function as an area setting unit configured to set what area of the operation surface to use as the first area, and
wherein the display control unit is configured to perform control to display the indicator at a different position depending on a position of the first area set by the area setting unit.

7. The electronic apparatus according to claim 1, wherein the display control unit is configured to perform control to display the indicator at a different position depending on a display position of the selection position before the predetermined touch operation is made on the operation surface.

8. The electronic apparatus according to claim 1,
wherein the at least one memory and the at least one processor further function as a setting unit configured to make any one of a plurality of settings including
a first setting to, in the case where the predetermined touch operation is made on the operation surface, move the selection position by a predetermined amount from a previous position of a touch operation on the operation surface based on the previous position of the touch operation without moving the selection position to a position corresponding to a touched position on the operation surface, and
a second setting to, in the case where the touch operation is made on the operation surface, move the selection position to a position corresponding to a touch position at which the touch operation on the operation surface is started regardless of the selection position before the touch operation, and
wherein the display control unit is configured to, in a case where the second setting is made by the setting unit and the predetermined touch operation is made, perform control to display the indicator at a predetermined position.

9. The electronic apparatus according to claim 8, wherein the indicator indicates a display area of the display unit.

10. The electronic apparatus according to claim 8, wherein the indicator indicates an entire area selectable by the selection position.

11. The electronic apparatus according to claim 1, wherein the predetermined touch operation is a start of a touch on the operation surface.

12. The electronic apparatus according to claim 1, wherein the predetermined touch operation is a start of the moving operation for making a touch on the operation surface and moving the touch.

13. The electronic apparatus according to claim 1, wherein the selection position is a selection position of a focus detection area.

14. The electronic apparatus according to claim 13, wherein the display control unit is configured to, in a case where a predetermined time has elapsed since an end of the predetermined touch operation on the first area of the operation surface, perform control to execute automatic focus processing at the selection position.

15. The electronic apparatus according to claim 14, wherein the display control unit is configured to, in a case where the predetermined touch operation on the operation surface is started again before the predetermined time has elapsed since the end of the predetermined touch operation on the first area of the operation surface, perform control such that the automatic focus processing is not executed.

16. The electronic apparatus according to claim 14, wherein the display control unit is configured to, in a case where the predetermined touch operation is started in the first area of the operation surface and moved from the first area to the second area by the moving operation, perform control to execute the automatic focus processing at the selection position at a point in time where the touch operation is moved to the second area or immediately before the touch operation is moved to the second area despite continuation of the predetermined touch operation.

17. The electronic apparatus according to claim 1,
wherein the at least one memory and the at least one processor further function as an approach detection unit configured to detect approach of an object, and
wherein the display control unit is configured to, in a case where the touch operation is made on the operation surface with the approach being detected by the approach detection unit, control the display of the indicator, and in a case where no approach is detected by the approach detection unit, perform control such that the indicator is not displayed regardless of whether the touch operation is made on the operation surface.

18. The electronic apparatus according to claim 1, further comprising:
an imaging unit;
a viewfinder; and
a display unit in the viewfinder,
wherein the control unit is configured to, in a case where the predetermined touch operation is made on the operation surface outside the viewfinder, perform control to display the indicator on the display unit in the viewfinder.

19. A method for controlling an electronic apparatus including a touch detection unit configured to detect a touch operation on an operation surface, the method comprising:
in a case where a moving operation for making a touch on the operation surface and moving the touch is made in a first area of the operation surface, controlling movement of a selection position displayed on a display unit by an amount corresponding to the moving operation, and in a case where the moving operation is made in a second area of the operation surface, the second area adjoining the first area, performing control such that the movement of the selection position is not performed; and
in a case where a predetermined touch operation is made in the first area, controlling display of an indicator indicating a movable range of the selection position by the moving operation on the display unit regardless of a distance from a border between the first and second areas to a touch position of the predetermined touch operation.

20. A non-transitory computer-readable recording medium storing a program that causes a computer to execute a method for controlling an electronic apparatus, the method comprising:
in a case where a moving operation for making a touch on the operation surface and moving the touch is made in a first area of the operation surface, controlling movement of a selection position displayed on a display unit by an amount corresponding to the moving operation, and in a case where the moving operation is made in a second area of the operation surface, the second area adjoining the first area, performing control such that the movement of the selection position is not performed; and
in a case where a predetermined touch operation is made in the first area, controlling display of an indicator indicating a movable range of the selection position by the moving operation on the display unit regardless of a distance from a border between the first and second areas to a touch position of the predetermined touch operation.

* * * * *